United States Patent [19]

Peter

[11] Patent Number: 5,528,436
[45] Date of Patent: Jun. 18, 1996

[54] LOW PROFILE MOTOR POWERED DISK ASSEMBLY FOR A RECORDING/REPRODUCING DEVICE

[75] Inventor: Gary M. Peter, Boise, Id.

[73] Assignee: Hewlett-Packard Company, Palo Alto, Calif.

[21] Appl. No.: 254,386

[22] Filed: Jun. 3, 1994

[51] Int. Cl.[6] ............................ G11B 17/02; G11B 17/08
[52] U.S. Cl. ................................... 360/99.08; 360/98.07
[58] Field of Search ............................ 360/99.08, 98.07; 310/156, 254, 268

[56] References Cited

U.S. PATENT DOCUMENTS

| | | | |
|---|---|---|---|
| 4,535,373 | 8/1985 | Schuh | 360/97 |
| 4,658,312 | 4/1987 | Elsässer et al. | 360/99.08 |
| 4,805,054 | 2/1989 | Kamoto et al. | 360/99.08 |
| 4,990,809 | 2/1991 | Artus et al. | 310/254 |
| 5,195,002 | 3/1993 | Sakurai | 360/99.08 |
| 5,251,082 | 10/1993 | Elliott et al. | 360/98.07 |
| 5,296,981 | 3/1994 | Ogawa | 360/99.08 |
| 5,298,825 | 3/1994 | Oudet et al. | 310/254 |
| 5,352,947 | 10/1994 | MacLeod | 360/98.07 |

*Primary Examiner*—John H. Wolff
*Assistant Examiner*—Adriana Giordana

[57] ABSTRACT

A low profile memory disk assembly includes a disk spindle motor, which is mounted in a housing, such as a thin, flat memory cassette housing. A hub of the disk spindle motor rotor mounts at least one disk. The hub also has a peripheral surface which mounts a permanent magnet ring. The housing has a recess bounded by thicker housing regions. The recess has a flat base. A salient pole stator for the motor is mounted to the flat base of the recess in a semicircular recess portion of the recess adjacent to the thicker housing sections to be stiffened or reinforced thereby. The motor rotor is journaled to the base within and concentric to the salient pole stator. The peripheral surface of the permanent magnetic ring defines radial gaps with the tips of the radially disposed salient poles of the salient pole stator. Radially magnetized, alternately poled, equally circumferentially spaced, permanent magnet poles in the permanent magnet ring, different in number from the number of salient poles of the salient pole stator, produce permanent magnet fields which interact with the electromagnetic fields of the salient poles to produce rotation of the motor rotor.

1 Claim, 4 Drawing Sheets

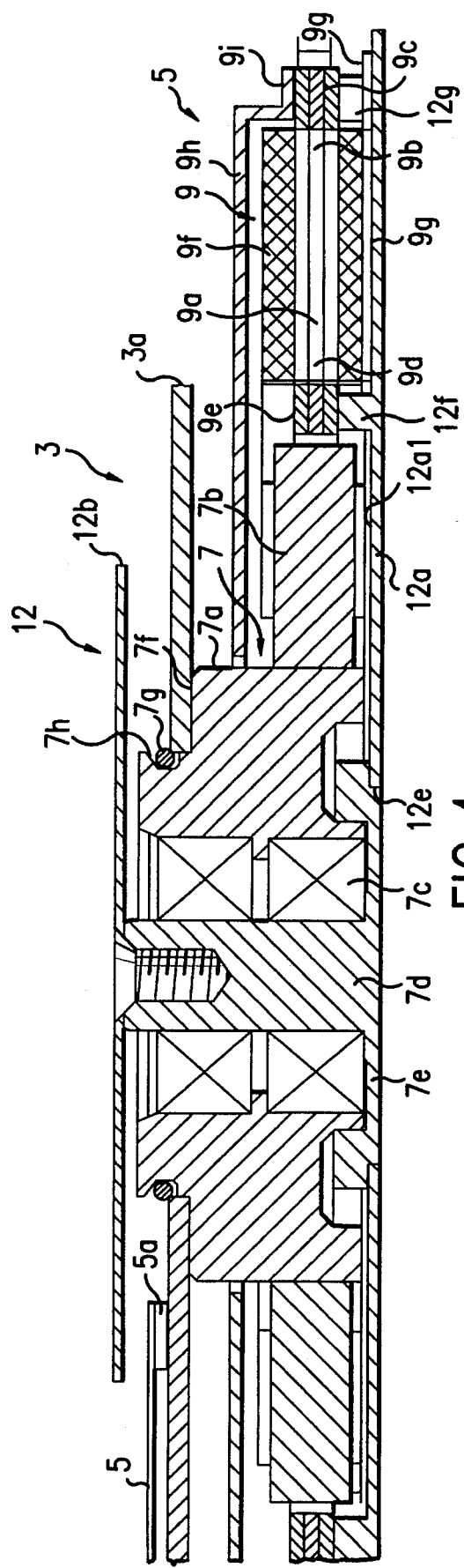
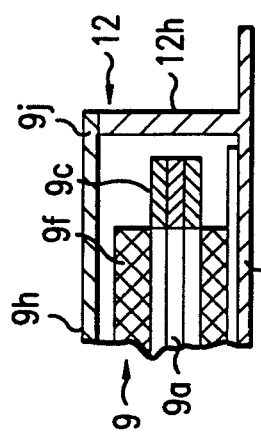

LOW PROFILE MOTOR POWERED DISK ASSEMBLY FOR A RECORDING/REPRODUCING DEVICE

RELATED PATENT APPLICATION

Patent application Ser. No. 07/975,761, filed 11/13/92, George A. Drennan et al inventors, entitled "Hard Disk Drive Memory Cassette", assigned to the assignee of this invention (PD 1092100).

TECHNICAL FIELD

This invention relates generally to low profile recording/reproducing devices, including the disk motor drives therefor, and, more in particular, to such devices in which the disk motor drive comprises a permanent magnet motor rotor having an external salient pole stator.

BACKGROUND OF THE INVENTION

Portability of computers or processors has brought a demand for increased memory storage capacity in small volumes. In an effort to meet this demand, small form factor disk drives have been installed in plug-in cassettes suited to such applications. Patent application Ser. No. 07/975,761, a related application, referenced above, is an example of such a disk drive application in a Personal Computer Memory Card International Association PCMCIA Type II cassette.

In a PCMCIA type of cassette application, there are four major areas requiring structural design attention.

1) The mechanical and electrical organizational relationship of the several parts within the cassette housing, including:
   a) the disk drive
   b) the disk controller
   c) the PCMCIA electrical connector, and
   d) any solid state memory advantageously placed in the cassette.
2) The specific design of the disk assembly, including the disk motor,
3) The specific design of the actuator assembly, usually a rotary actuator, including the actuator motor, and
4) The integration of the disk drive parts with the memory cassette housing within the memory cassette housing.

Such a disk drive application requires a low profile, hard disk assembly which necessarily includes the disk motor. Disk assemblies embodying features offering low profile design potential are seen in U.S. Pat. Nos. 5,195,002 and 5,251,082.

U.S. Pat. No. 5,195,002, to Sakurai, in one embodiment, discloses a disk assembly having a single disk mounted to the motor rotor of an axial gap, disk spindle motor. A rotary actuator assembly supports a transducer for movement to different radial locations with respect to a disk surface. A salient pole stator, having individual stator poles, is mounted beneath the motor rotor. The pole tips of the salient poles confront a surface of a permanent magnet ring which has permanent magnet poles. Positioning the salient pole stator and permanent magnet ring beneath the motor rotor, shields the head/disk assembly thereabove from stray fields of the motor. While this motor design, whether implemented in axial gap or radial gap configuration, is suited to low profile implementation, placing the salient pole stator beneath the motor rotor in an axial gap configuration, as shown, adds stator thickness and the permanent magnet ring thickness to the profile dimension of the disk assembly.

Another design of memory disk assembly in a disk drive, is seen in FIG. 1 of the drawings of the present patent application. Here, the memory disk assembly 1 employs a radial gap disk spindle motor 2. A memory disk 4 is secured to the motor rotor 6 of the disk spindle motor 2. An actuator assembly 5 supports a magnetic head 5a for movement to different radial locations with respect to the memory disk 4. The motor rotor 6 is umbrella shaped and comprises a peripheral permanent magnet ring 8 having discrete permanent magnetic poles, which are radially magnetized and alternately poled in sequential circumferential positions around the permanent magnet ring 8. A salient pole stator 10 is mounted to a base 12a of a housing 12, beneath the motor rotor 6. The salient pole stator 10 has a plurality of salient poles 10a, different in number from the number of permanent magnet poles in the permanent magnet ring 8, each of which mounts a coil 10b. The pole tips 10c of the salient poles 10a confront an inner peripheral face 8a of the permanent magnet ring 8, defining radial gaps therebetween. The motor rotor 6 is of magnetic material and provides, in its peripheral rim, 6a, a flux return path for the permanent magnet poles of the permanent magnet ring 8. As in the case of the patent to Sakurai, the motor rotor 6 shields the head/disk assembly 4, 5, from the magnetic fields of the disk spindle motor 2. Likewise the profile dimension of the disk assembly 1 includes the salient pole stator.

U.S. Pat. No. 5,251,082 to Elliot et al provides a disk spindle motor for a disk assembly in which a salient pole stator is disposed in a position external to the motor rotor. The rotor of this disk spindle motor comprises a permanent magnet ring which has discrete circumferentially distributed permanent magnet poles. This permanent magnetic ring is secured to the periphery of a memory disk. The disk/ring assembly constitutes the disk motor rotor. The salient pole stator is disposed outside of the permanent magnet ring, at one side of the disk motor rotor, with the pole tips of the salient pole stator adjacent the permanent magnet rotor ring.

While Elliot et al provides some structural detail of their disk drive, little is said or illustrated with respect to the type of disk which is employed, with respect to specific structural aspects of attaching the permanent ring to the disk, with respect to disk warpage in mounting and supporting the permanent magnet ring, with respect to whether an axial or radial gap motor is used (FIG. 21 shows neither), with respect to containing the magnetic field of the disk spindle motor to obviate interference of the motor magnetic fields with the read/write function of the head/disk assembly or, with respect to the structural problems from gyrodynamic and centrifugal forces acting on the spinning disk(s), imposed by the permanent magnet ring on the periphery of each disk. Also, the problems associated with designing adequate motor magnetic circuits, including the permanent magnet ring on each disk for producing useful motor torque are not addressed.

A need exists for a low profile memory disk assembly having a disk spindle motor of improved performance.

SUMMARY OF THE INVENTION

A memory disk assembly, representing the best mode presently known to the applicant for practicing this invention, comprises a support to which are mounted a disk spindle motor having a motor rotor rotatably mounted to the support and a salient pole stator which is mounted to the support in a position externally of and surrounding the motor rotor. At least one memory disk is mounted for rotation by the motor rotor. A metal shield is mounted stationarily with respect to the support in a position between the memory disk and the electrical motor, for the purpose of containing the stray magnetic field of the motor to prevent interference of the motor field with the read/write function of the head/disk assembly.

This memory disk assembly removes the salient pole stator from a position beneath the motor rotor, thereby reducing the profile dimension of the memory disk assembly. The motor rotor is reduced in diameter which advantageously reduces its moment of inertia. The radial dimension of the permanent magnet ring is increased significantly and, similarly, its axial thickness is also increased, to increase the permanent magnet flux capacity. By removing the salient pole stator from a position beneath the motor rotor, the restraint on stator thickness is relieved and the number of laminations in the stator may be increased to increase its magnetic flux capacity. Also, there is space for additional winding turns in each salient pole winding. By placing the salient pole stator externally of the motor rotor, the flexible circuit which interconnects the stator windings and which connects the stator windings to external circuits, is removed from a position beneath the motor rotor, which eliminates the thickness of the flexible circuit from the profile dimension of the disk assembly. In applications of the disk assembly in memory cassettes, where the disk assembly is mounted in a recess in a machined or cast housing of the memory cassette, externally of the motor rotor, the periphery of the salient pole stator is located close to peripheral edges of the recess, defined and bounded by thicker memory cassette housing regions, providing stiffer support for the salient pole stator. In a formed sheet metal housing, this thicker region may be implemented with a different part, a ring for example, or by stamping in an offset.

A memory disk assembly according to this invention provides a reduction in its profile dimension while providing a design basis for increasing the flux capacity of the motor's magnetic circuit, to thereby increase the performance of the disk spindle motor.

BRIEF DESCRIPTION OF THE DRAWINGS

A better understanding of this invention will be had by reference to the following specification when considered in conjunction with the accompanying drawings in which:

FIG. 4, is a cross sectional view of the memory disk assembly, according to this invention, taken in a section plane including the axis of the spindle of the disk spindle motor, and FIG. 5, illustrates a modification of a fragmentary portion of the sectional view of FIG. 4.

DETAILED DESCRIPTION OF THE PREFERRED EMBODIMENTS

Memory cassette applications require disk drives of small form factor. One such application, a prior art application, employing a memory disk assembly 1 of the type seen in FIG. 1, employs a hard disk drive of 1.3 form factor in a memory cassette housing 12, of 5 mm overall thickness. Allowing for the thickness of the top and bottom plates, 12a, 12b, respectively, of the memory cassette housing 12 and the disk drive clearance of these plates therewithin, the overall profile dimension of the enclosed disk drive is about 3.5 mm.

Figure 1:
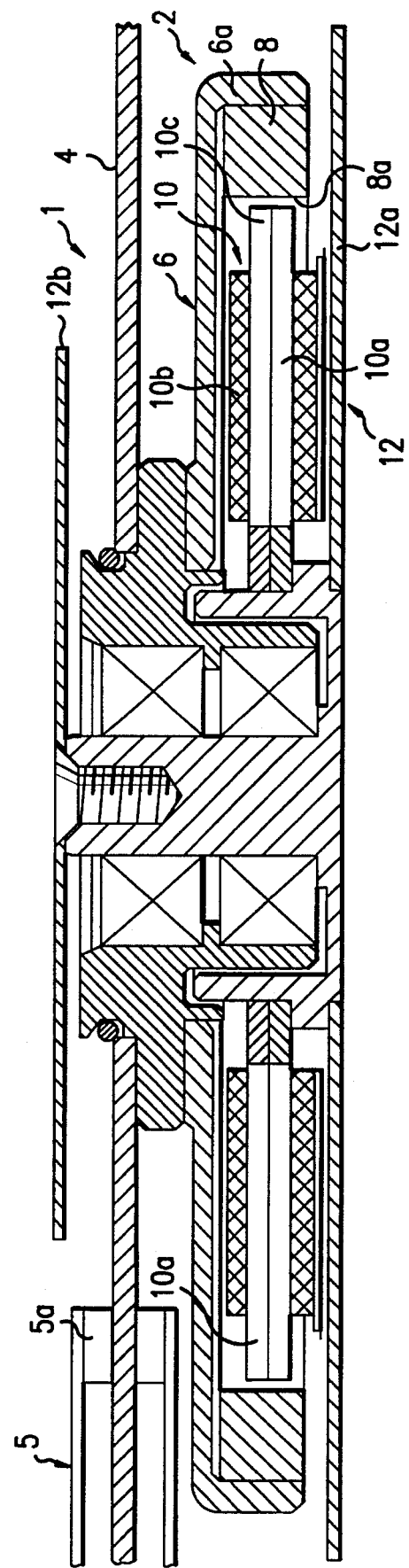
FIG. 1, is a cross sectional view of a prior art memory disk assembly.

Restraints on the profile thickness of the memory disk assembly 1, of FIG. 1, including the disk spindle motor 2, are severe, imposing an unyielding limit on the thickness and, hence, the cross section of the magnetic circuits of the disk spindle motor 2, correspondingly limiting its flux capacity which limits motor performance, requiring careful overall design to achieve satisfactory performance.

FIGS. 2–5, illustrate presently preferred embodiments of this invention, useful in recording/reproducing devices, in general, and having particular use in low profile, hard disk drive applications, including and meeting installation requirements, such as the installation requirements of a PCMCIA Type II memory cassette, for example.

In FIGS. 2–5, corresponding parts bear like reference characters.

Figure 2:
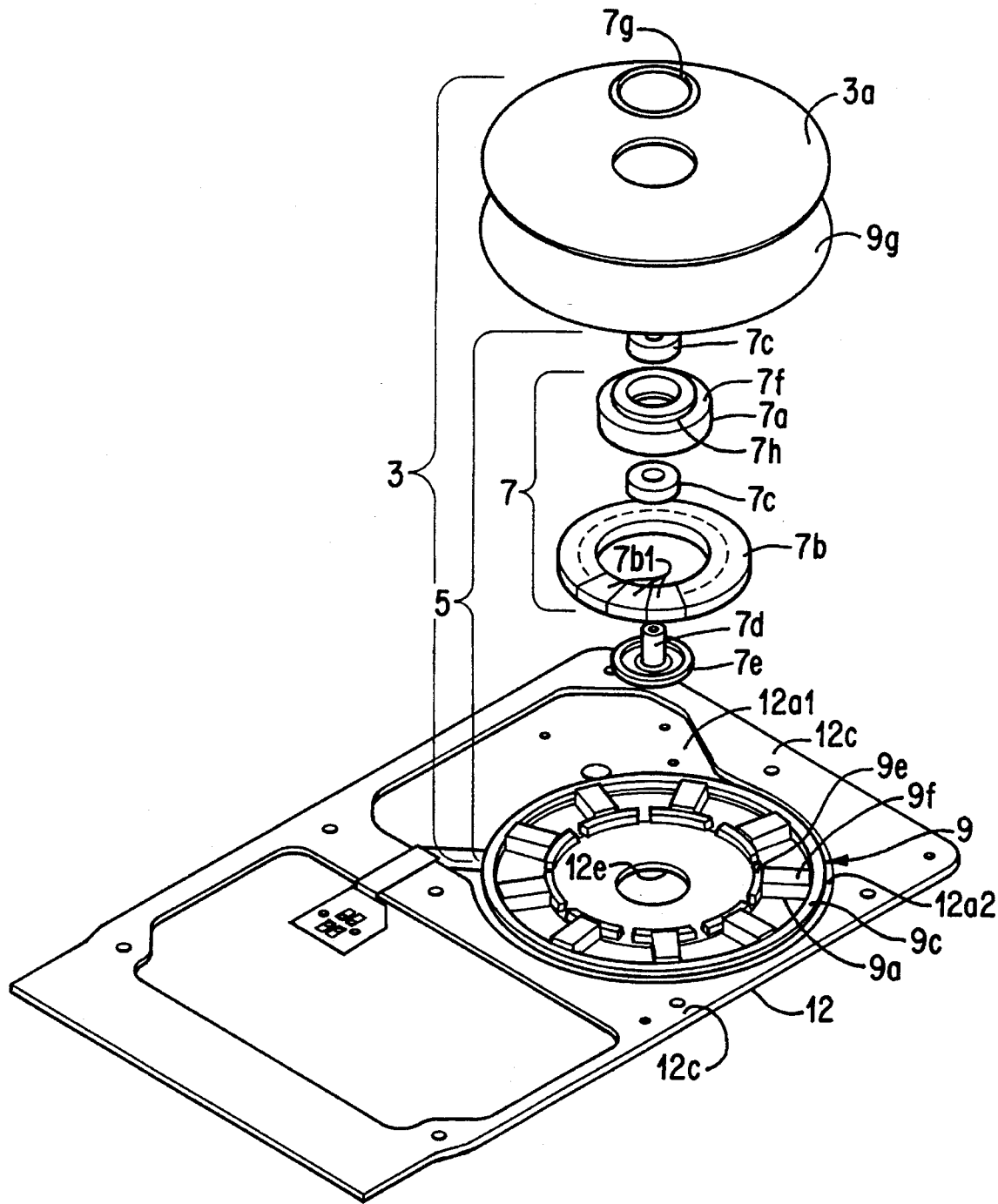
FIG. 2, is an exploded isometric view of a memory disk assembly, according to this invention, embodying a disk spindle motor having an external salient pole stator.
Figure 3:
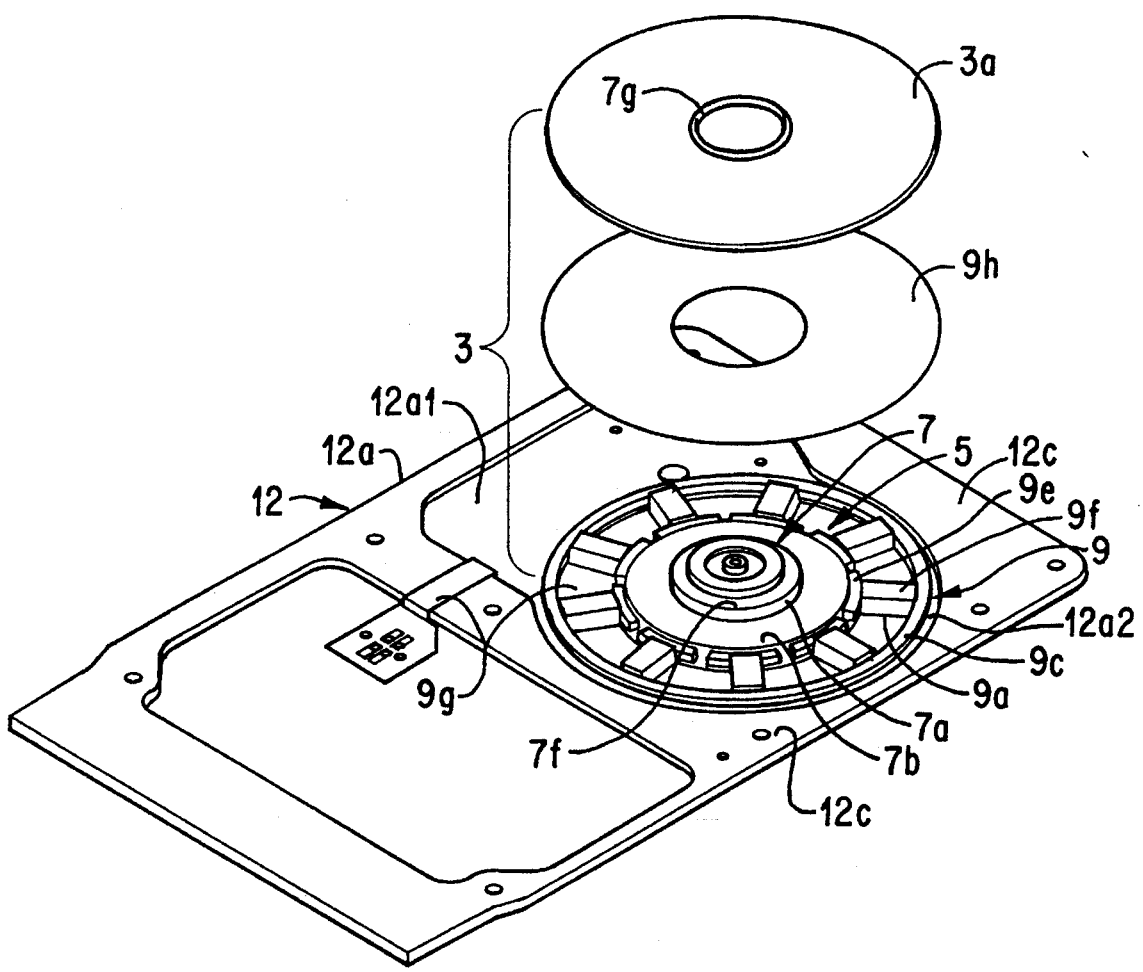
FIG. 3, is an exploded isometric view of the memory disk assembly of FIG. 2, in which the assembled motor rotor of the disk spindle motor is centrally disposed within the salient poles of the external salient pole stator.

A memory disk assembly 3 according to this invention, as seen in FIGS. 2–4, comprises a disk spindle motor 5. The disk spindle motor 5 comprises a motor rotor 7 and an external salient pole stator 9. The motor rotor 7 comprises a hub 7a of magnetic material and a permanent magnet ring 7b secured to the periphery of the hub 7a near the bottom of the hub. The permanent magnet ring 7b is provided with equally circumferentially spaced, radially magnetized, permanent magnet poles 7b1 which are alternately poled in sequence around the permanent magnet ring 7b. The hub 7a of the motor rotor 7, being of magnetic material, provides a return path for the flux of the permanent magnet poles 7b1 in the permanent magnet ring 7b.

The hub 7a is journaled by a coaxial bearing pair 7c for rotation about the axis of a spindle 7d having a spindle flange 7e secured to the base 12a of a support or housing 12.

As seen in FIGS. 2–4, the memory disk assembly 3 is disposed in a recess 12a1 in the base 12a of the housing 12. Only the base 12a of the housing 12, in the isometric views, FIGS. 2 and 3, of the drawings, is illustrated, in the interest of simplicity. The recess 12a1 is defined by thicker marginal housing regions 12c, FIGS. 2 and 3. A substantially semicircular recess portion 12a2 of the recess 12a1, as best seen in FIGS. 2 and 3, receives the memory disk assembly 3. To this end, the base 12a of the semicircular recess 12a2 is provided with an opening 12e which receives the spindle flange 7e of the spindle 7d. The spindle flange 7e is bonded in the opening 12e or otherwise secured therein.

The salient pole stator 9 comprises a plurality of radially disposed salient poles 9a joined together at their outer radial ends 9b by a stator ring 9c mechanically integrates and magnetically couples the salient poles. This salient pole stator 9 is mounted to the base 12a in the semicircular recess 12a2 of the housing 12 in a position substantially coplanar with and encircling the permanent ring 7b of the motor rotor 7. The inner radial ends 9d of the salient poles 9 mount arcuate salient pole segments 9e, FIGS. 2 and 3, functioning as pole tips, which are radially spaced from the peripheral surface of the permanent magnet ring 7b, defining radial gaps therebetween. Annuli 12f and 12g which project from the base 12a in the semicircular recess 12a2 of the housing 12, respectively support the pole tips 9e and the stator ring 9c of the salient pole stator 9. Each salient pole 9a of the salient pole stator 9, mounts a winding 9f. The number of salient poles 9a differs from the number of permanent magnet poles 7b1 in the permanent magnet ring 7b, the number being greater or less than the number of permanent magnet poles. The salient pole windings 9f are connected in "Y" or "delta" configuration by a flexible circuit 9g and are conventionally energized with bi-polar electrical energy to achieve rotation.

The flexible circuit 9g is bonded to the base 12a in the semicircular recess 12a2 beneath the windings 9f of the salient pole stator 9.

A memory disk 3a is mounted to an axial face 7f of the motor rotor hub 7a where it is secured by an elastic toroid 7g fitted into a circumferential groove 7h in the spindle 7d. The elastic toroid 7g is compressed between a surface of the circumferential groove 7h and an edge of the memory disk 3a at the hub 7a. As an alternative to the elastic toroid 7g, the memory disk 3a may be adhesively bonded to the axial face 7f of the rotor hub 7a. The toroid or the adhesive bond constitutes the sole attachment of the disk to the hub 7a of the motor rotor 7.

A shield 9h, preferably of magnetic material, is stationarily disposed between the motor 5 and the disk 3a of the memory disk assembly, for containing the motor fields and shielding the disk 3a and the magnetic heads 5a, from stray motor fields, thereby obviating stray motor field interference with the read/write function of the head/disk assembly. In FIG. 4, a peripheral flange 9i on the shield 9h, is bonded to the stator ring 9c. In FIG. 5 an annulus 12h, projecting from the base 12a supports a peripheral edge 9j of the shield 9h. Other techniques for stationarily securing the shield 9g to the base may be employed. The only requirement being that the shield 9g be stationarily positioned between the motor 5 and the disk 3a.

Dimensional restrictions in the profile dimension, such as those existing in prior art structures, in which the salient pole stator is coaxially disposed beneath the motor rotor, are relieved in the structural arrangement provided by this invention. Positioning the salient pole stator 9 externally of and encircling the motor rotor 7, provides design freedom of the motor magnetic circuits in the direction of the profile dimension of the memory disk assembly 3. The cross sectional dimensions of the magnetic circuits, i.e., the axial thickness of the permanent magnet ring 7b and the thickness of the salient pole stator 9, are now increased, which, together with an increase in the number of winding turns in the winding 9a, increases the magnetic flux in the motor to improve motor performance. This also allows freedom in the choice of materials for the rotor since the rotor material is not used to shield the motor. A ring of "back-iron" can be attached to an aluminum hub, for example, for reasons of better machining capability on the rotor hub, etc.

What is claimed is:

1. A memory disk assembly for a recording/reproducing device, comprising:

a. a support having an inner annular member concentric with an outer annular member;

b. an electric motor having a motor rotor rotatably mounted to said support within said inner annular member and a salient pole stator mounted to said inner annular member and to said outer annular member externally of said motor rotor;

c. said motor rotor comprising a hub of magnetic material and a permanent magnet ring secured to the periphery of said hub near the bottom of said hub;

d. said permanent magnet ring having a cylindrical surface and having equally circumferentially spaced radially magnetized, permanent magnet poles which are alternately poled in sequence around the permanent magnet ring, said hub being of a magnetic material providing a return path for the flux of the permanent magnet poles in said permanent magnet ring;

e. said salient pole stator comprising a plurality of radially disposed salient stator poles, a stator ring joining together the outer radial ends of said salient stator poles, said stator ring also being mounted to said outer annular member, said salient stator poles being different in number from the number of permanent magnet poles in said permanent magnet ring;

f. an arcuate pole tip attached to the inner radial end of each salient pole and mounted to said inner annular member in a position radially spaced from said cylindrical surface of said permanent magnet ring;

g. at least one memory disk mounted to said hub for rotation by said motor;

h. a circular metal shield having an outer circumferential flange and a central opening;

i. said flange of said circular metal shield being mounted to said stator ring with said central opening encircling said hub, said circular metal shield covering said salient pole stator and said permanent magnet ring for magnetically shielding said memory disk from said motor.

\* \* \* \* \*